United States Patent Office 3,373,159
Patented Mar. 12, 1968

3,373,159
AZINEDIONES
James C. Martin and Kent C. Brannock, Kingsport, Tenn., assignors to Eastman Kodak Company, Rochester, N.Y., a corporation of New Jersey
No Drawing. Filed Dec. 13, 1965, Ser. No. 513,602
10 Claims. (Cl. 260—244)

This invention relates to certain azinediones as novel compositions of matter. It further relates to a method for combining substituted malonyl chlorides with certain unsubstituted and N-substituted amides and thioamides and unsubstituted and N-substituted acetamidines to produce novel azinediones.

A review of the literature reveals that the compounds of this invention have not been reported. Although there is no mention in the literature of the azinediones of this invention, other azinediones and the reaction of malonyl chloride dimer to form heterocyclic compounds are mentioned. In their book entitled, "Advances in Heterocyclic Chemistry" (vol. 2, A. R. Katritzky, ed., Academic Press, New York, N.Y., 1963, pp. 311–342), Z. Eckstein and T. Urbanski disclose 4H-1,3-oxazinediones but do not mention the compounds of this invention.

A series of papers by J. A. Elvidge and coworkers entitled, "Heterocyclic Synthesis with Malonyl Chloride," J. Chem. Soc., deals with the reactions of malonyl chloride dimer to form heterocyclic compounds. Part I of those papers, 1952, 4109, "Pyrano-1:3-dioxins from Ketones," pertains to the reaction between malonyl chloride and acetone to obtain the new unsaturated hetero-dicyclic system, 2:2-disubstituted derivatives of 6′-chloro-2′:4-diketo-pyrano(3′:4′-5:6)-1,3-dioxin. Part II of those papers, 1953, 2251, "2:2-Disubstituted 6′-Amino-2′:4-diketopyrano(3′:4′-5:6)-1,3-dioxins and Simpler Derivatives of 4-Keto-1:3-dioxin," relates to chloropyronodioxins which are prepared from malonyl chloride and ketones and react stepwise with primary and secondary amines to yield the (non basic) aminopyronodioxins, and, then by fission of the aminopyronodioxins with the pyrone ring to yield biscarboxamide derivatives of 4 keto-1:3-dioxin. Part III, 1962, 2060, "The Course of the Reaction with Simple Ketones, and Additional Evidence for the Constitutions of the Products," deals with the reaction of malonyl chloride with simple ketones, which takes place in two main stages, by way of self-condensation to 6-chloro-4-hydroxy-2-oxo-pyran-3-carbonyl chloride to form dicyclic chlorodioxo-pyranodioxins. Part IV, 1962, 3550, "Pyrano-dioxins from an Enolic Ketone, Diketones and Benzaldehyde, and a Modification of the Doebner Condensation," describes the formation of pyranodioxins from malonyl chloride with acetone-1,3-dicarboxylic ester, biacetyl, benzil and benzaldehyde. Part V, 1962, 3553, "5-Oxopyrano[3,4-e]-[1,3] oxazines from Nitriles, and their Degradation to 4-Oxo-1,3-oxazines and Other Products," details the reaction of 2 mols of malonyl chloride at 100° C. with benzo-, aceto-, and naphtho-nitrile to yield 2-substituted 7-chloro-4,5-di-oxopyrano[3,4-e]-[1,3]-oxazines. Part VI, 1962, 3638, "3-Substituted Pyridine Derivatives from α-Methylene-nitriles," sets forth the process wherein acetonitrile condenses with malonyl chloride at room temperature giving 2-chloro-4,6-dihydroxy-3-methylpyridine which was converted into the 2,4,6-trichloro-derivative and thence by reduction, into 3-pecatine. Also discussed is the use of bromomalonyl chloride with ethyl cyanoacetate to yield fully substituted 5-bromo-2-chloro-3-ethoxycarbonyl-4,6-dihydroxy-pyridine. Part VII, 1963, 3069, "Dihydropyrano[3,4-e]-1,3-oxazines from Isocyanates, and their Degradation to Dihydro-2,4-dioxo-1,3-oxazines and thence Conversion into Pyridones," describes the reaction process of isocyanates with malonyl chloride to yield 3-substituted 7 - chloro - 3,4 - dihydro - 2,4,5 - trioxo - 2H,5H - pyrano-[3,4-e]-1-3-oxazines and mainly phenyl isothiocyanate to yield the 4,5-dioxo-3-phenyl-2-thio-compound. Part VIII, 1963, 4483, "Hydroxypyrones from 1,3-Diketones," relates to the process where malonyl chloride condenses with acetylacetone, to yield 3-acetyl-5-hydroxy-2-methyl-4-pyrone, and with benzoylacetone to obtain 5-acetyl-4-hydroxy-6-phenyl-2-pyrone. The latter tautomerizes above its melting point into the 2-hydroxy-4-pyrone.

It is an object of this invention to provide certain azinediones as new compositions of matter.

Another object is to provide a method for preparing such compounds by reacting a disubstituted malonyl chloride with certain N-substituted and unsubstituted amides and thioamides and N-substituted and unsubstituted acetamidines.

These and other objects are obtained by the practice of this invention which, briefly, comprises mixing a disubstituted malonyl chloride and an amide, thioamide, or acetamidine in an inert solvent in the presence or absence of a basic hydrogen chloride acceptor and isolating the product.

More specifically, the certain azinediones are obtained by reacting a compound having the formula

with a substituted malonyl chloride having the formula

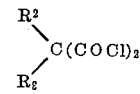

and providing azinediones having the formula

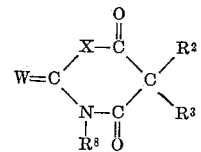

wherein X is selected from the group consisting of oxygen, sulfur and an imino radical of the formula

M is selected from the group consisting of

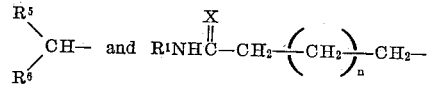

W is selected from the group consisting of

and

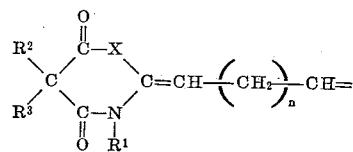

wherein $n$ is an integer from 0 to 8; each of the substituents $R^1$ and $R^4$, when taken singly, is selected from the group consisting of hydrogen alkyl, preferably having 1 to 10 carbon atoms, and mononuclear aryl having 6 to 10 carbon atoms; each of the substituents $R^2$ and $R^3$, when taken singly, is selected from the group consisting of alkyl, preferably of 1 to 10 carbon atoms, and mononuclear aryl having 6 to 10 carbon atoms; each of the substituents $R^5$ and $R^6$, when taken singly, is selected from the group consisting of hydrogen, halogen, alkyl, preferably having from 1 to 10 carbon atoms, and mononuclear aryl having 6 to 10 carbon atoms; $R^8$ is hydrogen, alkyl, preferably having 1 to 10 carbon atoms, mononuclear aryl having 6 to 10 carbon atoms or an acyl of the formula

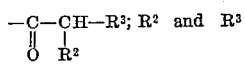

when taken collectively with the carbon atom to which they are attached, represent joined alkylene groups completing a carbocyclic ring of 4 to 6 ring carbon atoms; $R^6$ and $R^8$, when taken collectively with the carbon and nitrogen atoms to which they are attached, represent joined alkylene groups completing a heterocyclic ring of 4 to 6 ring carbon atoms; and $R^5$ and $R^6$, when taken collectively with the carbon atom to which they are attached, represent joined alkylene groups completing a carbocyclic ring of 4 to 6 ring carbon atoms.

The amides, thioamides and acetamidines that are suitable for use in the present process are well-known compounds that have been prepared by a variety of methods and include the following materials: acetamide, N-methylacetamide, N-butylacetamide, N-octylacetamide, N-methylchloroacetamide, N-ethyldichloroacetamide, N-propylpropionamide, N - butylisobutyramide, N - methylcrotonamide, N-methyl-2-ethylhexamide, N-methyldiphenylacetamide, N,N'-dimethyladipamide, N-methylthioisobutyramide, acetanilide, p-methoxyacetanilide, thioacetanilide, isobutyranilide, p-chloroacetanilide, m-nitroacetanilide, 2-pyrrolidinone, acetamidine, dimethylacetamidine, N-phenylacetamidine and N,N'-diphenylacetamidine, etc.

The substituted malonyl chlorides that are suitable for the present process includes the following: diphenylmalonyl chloride, dimethylmalonyl chloride, diethylmalonyl chloride, ethylmethylmalonyl chloride, dibutylmalonyl chloride, butylethylmalonyl chloride, methylpropylmalonyl chloride, dioctylmalonyl chloride, dibenzylmalonyl chloride, etc. These compounds may be prepared according to known techniques by reacting the corresponding dialkylmalonic acid with thionyl chloride or a similar chlorinating agent.

In the process for preparing certain azinediones by reacting unsubstituted and N-substituted amides and thioamides and unsubstituted and N-substituted acetamidines with a substituted malonyl chloride, it is preferred but not necessary to use a solvent. Suitable solvents are restricted to materials that do not react with the reagents. Typical classes of solvents include ethers, esters, aliphatic and aromatic hydrocarbons and chlorinated hydrocarbons, nitriles, and certain dipolar aprotic solvents such as dimethylformamide, dimethylacetamide, dimethylsulfoxide, tetramethylene sulfone, propylene carbonate, etc.

In the practice of this process, it is preferred, for best operation, to use a hydrogen chloride acceptor material in the reaction medium to keep the reaction from becoming too acidic. However, the reaction may be operated either using an excess of hydrogen chloride acceptor material in the reaction medium or it may be run in the absence of a hydrogen chloride acceptor. It is preferred to use an anhydrous system. Hydrogen chloride acceptor materials such as triethylamine, trimethylamine, triethylene diamine, 1,4-dimethylpiperazine, tributylamine, pyridine, quinoline and N,N'-dimethylethylenediamine may be employed in the anhydrous system. However, an aqueous system using such bases as sodium hydroxide or potassium hydroxide is workable.

The substituted malonyl chloride and a compound selected from the group consisting of unsubstituted and N-substituted amides and thioamides and unsubstituted and N-substituted acetamidines may be added to a suitable solvent and hydrogen chloride acceptor to form a product. However, in the practice of the invention, it is preferred to add the malonyl chloride rapidly to a solution of one of the above noted amides, thioamides or acetamidines, hydrogen chloride acceptor material and a suitable solvent. The molar ratio of the substituted malonyl chloride, to the amide, thioamide or acetamidine and the hydrogen chloride acceptor material is generally 1:1:2–3. Variation of the molar ratio may be practiced.

The temperature of the subject reaction is generally governed by the nature of the reactants with the suitable reaction temperature within the range of from 0° to 200° C.

The compounds of the present invention are useful as pharmaceutical intermediates as well as plasticizers for resin compounds such as polyvinyl chloride. Example 16 exemplifies the use of a compound of this invention as a plasticizer for polyvinyl chloride.

The following examples illustrate the best modes contemplated for carrying out this invention.

*Example 1*

Dimethylmalonyl chloride (84.5 g.; 0.5 mole) was added rapidly to a stirred solution of N-methylacetamide (36.5 g.; 0.5 mole) and triethylamine (1.5 mole) in toluene (500 ml.). The reaction temperature rose to 90° C. and a large amount of solid precipitated. After stirring for 2 hrs., the solid was removed by filtration and washed several times with ether. The solid material consisted of 135.3 g. (98.5%) of triethylamine hydrochloride. Distillation of the filtrates through a 6-in. Vigreux column gave 60.5 g. (73%) of dihydro-3,5,5-trimethyl-2-methylene-4H-1,3-oxazine-4,6(5H)-dione, B.P. 78–80° C. (1 mm.). The following equation represents the reaction that took place:

$$CH_3\overset{O}{\overset{\|}{C}}NHCH_3 + (CH_3)_2C(COCl)_2 \longrightarrow$$

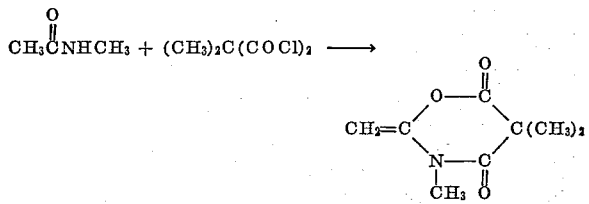

*Analysis.*—Calcd. for $C_8H_{11}NO_3$: C, 56.8; H, 6.6; N, 8.3. Found: C, 56.9; H, 6.8; N, 8.5. Infrared maxima (neat) at 5.67, 5.9 to 6.15 (broad). NMR (neat): singlet at 1.38 (gem-dimethyl groups), singlet at 3.22

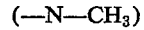

and quartet at 4.28 ($CH_2=$). The NMR spectrum was recorded on a Varian A–60 instrument operating at 60 mc. Values reported are in p.p.m. (δ) referred to tetramethylsilane as an internal standard.

*Example 2*

Dimethylmalonyl chloride (84.5 g.; 0.5 mole) was added rapidly to a stirred solution of acetanilide (67.5 g.; 0.5 mole) and triethylamine (152 g.; 1.5 mole) in toluene (800 ml.). The reaction was slowly exothermic. Stirring was continued for 18 hrs., and the solid was removed by filtration and washed several times with ether. The dried solid consisted of 137 g. (99.5%) of triethylamine hydrochloride. Evaporation of the filtrates gave a solid residue. Trituration of this material with ether gave 59.1 g. (51%) of crude dihydro-5,5-dimethyl-2-methylene-3-phenyl-4H-1,3-oxazine-4,6(5H)-dione, M.P. 106–108° C. A sample for analysis was recrystallized from a mixture of hexane and benzene to give material melting at 108.5–

109° C. The reaction that took place is represented by the following equation:

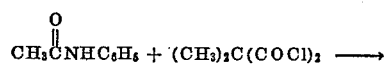
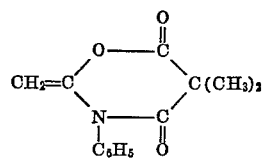

*Analysis.*—Calcd. for $C_{13}H_{13}NO_3$: C, 67.5; H, 5.6; N, 6.1. Found: C, 67.0; H, 5.9; N, 5.8. Infrared maxima (KBr) at 5.63, 5.92, 6.07, and 6.26$\mu$.

Example 3

Dimethylmalonyl chloride (118 g.; 0.7 mole) was added rapidly to a stirred solution of N-butylisobutyramide (100 g.; 0.7 mole) and triethylamine (200 g.; 2 moles) in toluene. A solid precipitate which consisted of 184 g. (96%) of triethylamine hydrochloride was obtained. The filtrate contained 126 g. (76%) of 3-butyldihydro-2-isopropylidene-5,5-dimethyl - 4H - oxazine-4,6(5H)-dione, B.P. 116–119° C. (1 mm.). The reaction that occurred is represented by the following equation:

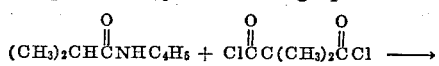
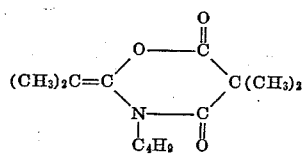

*Analysis.*—Calcd. for $C_{13}H_{21}NO_3$: C, 65.2; H, 8.8; N, 5.9. Found: C, 65.8; H, 9.0; N, 5.9. Infrared maxima (neat) at 5.66, 5.90 and 5.98$\mu$.

Example 4

Dimethylmalonyl chloride (42.25 g.; 0.25 mole) was added rapidly to a stirred solution of N-methylisobutyramide (25.25 g.; 0.25 mole) and triethylamine (101 g.; 1 mole) in toluene (200 ml.). The reaction that took place gave 28.5 g. (57%) of dihydro-2-isopropylidene-3,5,5-trimethyl-4H-1,3-oxazine-4,6(5H)-dione, B.P. 89–98° C. (1 mm.), $n_D^{20}$ 1.4940. This material crystallized on standing and a sample for analysis was recrystallized from ether to give material melting at 57–58° C. The following equation represents the reaction that took place:

$$(CH_3)_2CH\overset{O}{\overset{\|}{C}}NHCH_3 + (CH_3)_2C(COCl)_2 \longrightarrow$$

[structure of product]

*Analysis.*—Calcd. for $C_{10}H_{15}NO_3$: C, 60.3; H, 7.6 Found: C, 60.5; H, 7.7.

Example 5

Under the general conditions of Example 1, the disubstituted malonyl chlorides and amides listed in the following table react to give the indicated products.

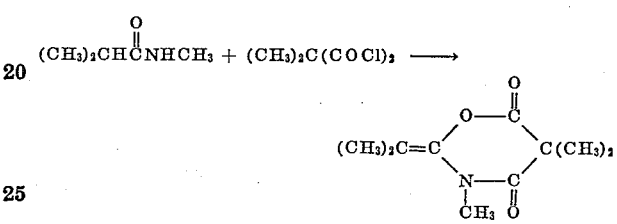

Example 6

Dimethylmalonyl chloride (51 g.; 0.3 mole) was added during 45 min. to a stirred solution of N-methylcrotonamide (29.6 g.; 0.3 mole) and triethylamine (91 g.; 0.9 mole) in toluene (350 ml.). A solid was formed at once and the temperature rose spontaneously to 75° C. The resulting suspension was allowed to cool slowly and was stirred at 25° C. for 18 hr. Triethylamine hydrochloride was removed by filtration. The filtrate was distilled rapidly through a 6″ Vigreux column to give 45 g. (84%) of 2-allylidenedihydro - 3,5,5 - trimethyl - 4H-1,3-oxazine-4,6-(5H)dione, B.P. 100–115° C. (0.5 mm.), M.P. 79–88° C. crystallization from toluene gave crystals, M.P. 90–92° C. The reaction that took place is represented by the following equation:

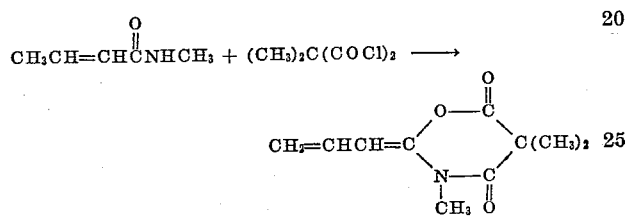

*Analysis.*—Calcd. for $C_{10}H_{13}NO_3$: C, 61.5; H, 6.7; N, 7.2. Found: C, 61.3; H, 6.8; N, 7.4.

The NMR spectrum of this material is in complete agreement with the assigned structure.

Example 7

When dimethylmalonyl chloride (185 g.; 1.1 mole) was added during 30 min. interval to a stirred solution of N-methylpropionamide (82 g.; 1.1 mole) and triethylamine (303 g.; 3.0 mole) in toluene (1600 ml.) a solid was formed at once and the temperature rose spontaneously to 80° C. The resulting suspension was allowed to cool slowly and was stirred at 25° C. for 18 hr. Triethylamine hydrochloride was removed by filtration. The filtrate was distilled through a 12-in. packed column to give 161 g. (80%) of 2 - ethylidenedihydro - 3,5,5,trimethyl-4H-1,3-oxazine-4,6-5H-dione, B.P. 83–85° C. (0.5 mm.), M.P. 65–70° C. The reaction that occurred is represented by the following equation:

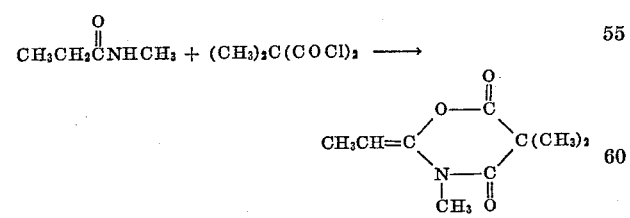

*Analysis.*—Calcd. for $C_9H_{13}NO_3$: C, 59.0; H, 7.2 Found: C, 59.4; H, 7.3.

The NMR spectrum of this material was in complete agreement with the assigned structure.

Example 8

When dimethylmalonyl chloride (33.8 g.; 0.2 mole) was added during 15 min. intervals to a stirred solution of 2-pyrrolidinone (17.0 g.; 0.2 mole) and triethylamine (61 g.; 0.6 mole) in toluene (400 ml.), an exothermic reaction occurred with the temperature rising rapidly to 70° C. The resulting suspension was allowed to cool slowly and was stirred at 25° C. for 18 hr. Triethylamine hydrochloride was removed by filtration. The filtrate was distilled rapidly through a 6″ Vigreux column to give a 22 g. fraction, B.P. 104–122° C. (1.5 mm.), which partially crystallized on standing to give 9.4 g. (26%) of 6,7-dihydro-3,3-dimethylpyrrolo[2,1-b][1,3]oxazine-2,4(3H)-dione, M.P. 68–72° C. The reaction that took place is illustrated by the following equation:

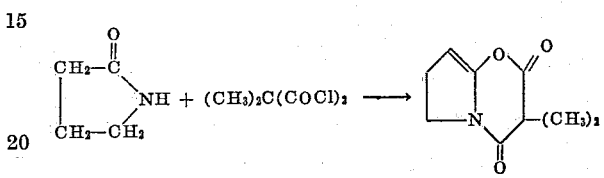

The NMR spectrum of this product is in complete agreement with the assigned structure.

Example 9

To a stirred solution of N,N-diphenylacetamidine (25 g.; 0.12 mole) and triethylamine (30.3 g.; 0.3 mole) in toluene (150 ml.) was added rapidly dimethylmalonyl chloride (20.3 g.; 0.12 mole). The reaction was exothermic with the temperature rising to 90° C. A large amount of solid precipitate was obtained. After stirring for 2 hr. the mixture was filtered to give 57.7 g. of solid. This solid was stirred with water (150 ml.) to remove triethylamine hydrochloride. The insoluble material was dihydro-2-methylene-5,5 - dimethyl-1,3 - diphenylpyrimidine-4,6-(1H,5H)-dione, M.P. 198.5–199.5° C., and weighed 24.5 g. (67%). The following equation represents the reaction that took place:

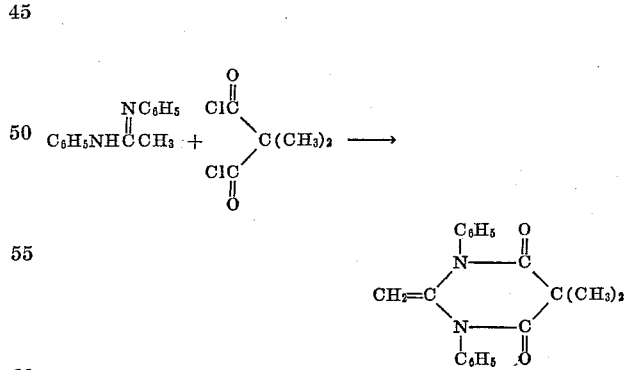

*Analysis.*—Calcd. for $C_{19}H_{18}N_2O_2$: C, 74.5; H, 5.9; N, 9.1. Found: C, 74.7; H, 6.1; N, 9.2. Infrared (KBr): 5.84, 5.96 and 6.22μ. NMR (CHCl₃): singlet at 1.62 (methyls), singlet at 3.58 (CH₂=C), and a multiplet at 7.49 (aromatic protrons).

Example 10

Under the general conditions and process of Example 9, dimethylmalonyl chloride is reacted with acetamidine, dimethylacetamidine and N-phenylacetamidine to obtain, respectively, the indicated products.

| Malonyl Chloride | Acetamidine | Product |
|---|---|---|
| $\underset{CH_3}{\overset{CH_3}{>}}C(COCl)_2$ | $CH_3-\overset{NH}{\underset{NH_2}{C}}$ | (structure: $CH_2=C$ ring with N-H, C=O, N-H, C=O, $C-(CH_3)_2$) |
| $\underset{CH_3}{\overset{CH_3}{>}}C(COCl)_2$ | $(CH_3)_2CH-\overset{NH}{\underset{NH_2}{C}}$ | (structure: $(CH_3)_2C=C$ ring with N-H, C=O, N-H, C=O, $C-(CH_3)_2$) |
| $\underset{CH_3}{\overset{CH_3}{>}}C(COCl)_2$ | $\underset{CH_3-\overset{\|}{C}=NH}{C_6H_5-NH}$ | (structure: $CH_2=C$ ring with N-$C_6H_5$, C=O, N-H, C=O, $C-(CH_3)_2$) |

Example 11

Under the general conditions of the process described in Example 1, the reaction of N-methyldiphenylacetamide (53.0 g.; 0.235 mole), triethylamine (75 g.; 0.75 mole), dimethylmalonyl chloride (42.2 g.; 0.25 mole) and tetrahydrofuran (600 ml.) gave 75.3 g. of crude dihydro-2-(diphenylmethylene)-3,5,5-trimethyl - 4H - 1,3-oxazine-4,6(5H)dione. Recrystallization from a benzene-hexane mixture followed by recrystallization from ethyl alcohol gave 37.1 g., M.P. 132–136° C. The following equation represents the reaction that took place.

$$(C_6H_5)_2CH\overset{O}{\overset{\|}{C}}NHCH_3 + (CH_3)_2C(COCl)_2 \longrightarrow$$

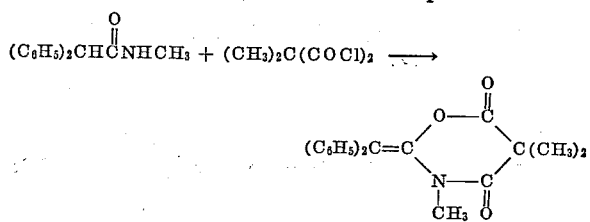

*Analysis.*—Calcd for $C_{20}H_{19}NO_3$: C, 74.7; H, 6.0; N, 4.4. Found: C, 74.8; H, 6.1; N, 4.6.

Example 12

Using the process and under the general conditions of Example 1, the reaction of thioacetanilide (25 g.; 0.165 mole), triethylamine (50 g.; 0.5 mole), dimethylmalonyl chloride (27.8 g.; 0.165 mole) and toluene (300 ml.) gave 38.2 g. (100%) of crude dihydro-5,5-dimethyl-2-methylene-3-phenyl-4H-1,3-thiazine - 4,6(5H)-dione. Recrystallization of this material from a mixture of hexane and benzene gave 28.6 g., M.P. 114–116° C. The reaction is represented by the following equation:

$$CH_3\overset{S}{\overset{\|}{C}}NHC_6H_5 + (CH_3)_2C(COCl)_2 \longrightarrow$$

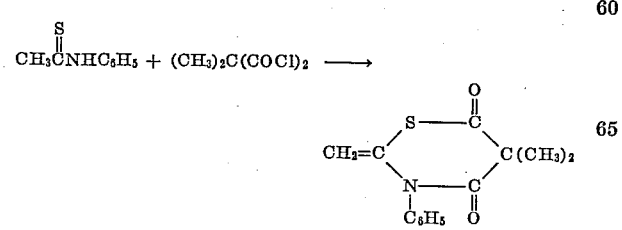

Example 13

Dimethylmalonyl chloride (33.8 g.; 0.2 mole) was added rapidly to a solution of N,N'-dimethyladipamide (17.2 g.; 0.1 mole) and triethylamine (61 g.; 0.6 mole) in toluene (300 ml.). This solution was refluxed for one hour, cooled and filtered. The obtained solid was washed with water to remove triethylamine hydrochloride. There remained 29.8 g. (82%) of crude 2,2'-butylidene bis[dihydro-3,5,5 - trimethyl-4H-1,3-oxazine - 4,6(5H)-dione] M.P. 203–206° C. The reaction is represented by the following equation:

$$CH_3NH\overset{O}{\overset{\|}{C}}(CH_2)_4\overset{O}{\overset{\|}{C}}NHCH_3 + (CH_3)_2C(COCl)_2 \longrightarrow$$

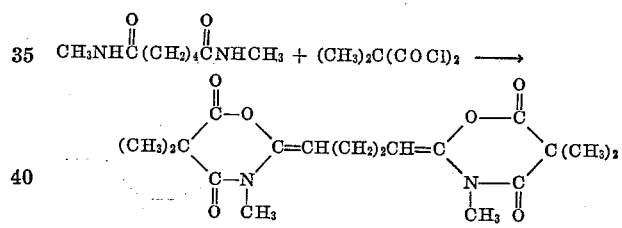

Example 14

Dimethylmalonyl chloride (20.3 g.; 0.12 mole) was added rapidly to a stirred solution of N-methylthioisobutyramide (14.0 g.; 0.12 mole) and triethylamine (37 g.; 0.36 mole) in toluene (100 ml.). The temperature rose to 80° C. and a large amount of solid was formed. The solid was removed by filtration and the filtrate distilled through a 6-in. Vigreux column to give 20.7 g. (81%) of dihydro - 2 - isopropylidene - 3,5,5 - trimethyl-4H-1,3-thiazine-4,6(5H) dione, B.P. 103–106° C. (0.1 mm.). The following equation represents the reaction that took place:

$$(CH_3)_2CH\overset{S}{\overset{\|}{C}}NHCH_3 + (CH_3)_2C(COCl)_2 \longrightarrow$$

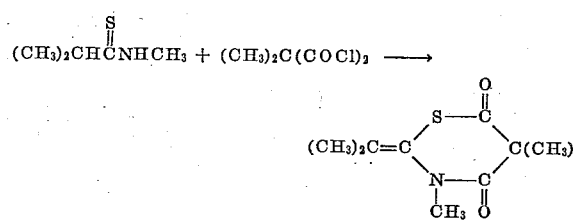

Example 15

Using the process described in Example 14, a mixture of dodecylisobutyramide (127.7 g.; 0.5 mole) triethylamine (152 g.; 1.5 moles), dimethylmalonyl chloride (84.5 g.; 0.5 mole) and toluene (600 ml.) gave an almost quantitative yield of crude dihydro-3-dodecyl-2-isopropylidene-5,5-dimethyl-4H-1,3-oxazine-4,6(5H)-dione. A 25 g. sample was distilled rapidly through a Claisen still head to give 17 g. of product, B.P. 182–184° C. (0.5 mm.).

The following equation represents the reaction that took place:

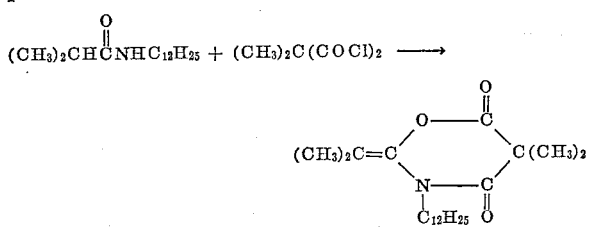

The following example illustrates one of the varied uses of the substituted dihydro-4H-1,3-oxazine-4,6(5H)-diones.

Example 16

Fifty parts of dihydro-3-dodecyl-2-isopropylidene-5,5-dimethyl-4H-1,3-oxazine-4,6(5H)-dione and fifty parts of polyvinyl chloride are milled together on heated rolls. The resulting plasticized resin is quite flexible and tough.

The following example demonstrates that a hydrogen chloride acceptor material is not always needed in the practice of the present invention.

Example 17

A solution of N-methylisobutyramide (20.2 g.; 0.2 mole) and dimethylmalonyl chloride (37.2 g.; 0.22 mole) in ethylene dichloride (125 ml.) was refluxed for 4 hr. The reaction mixture was distilled through a 4-in. Vigreux column to give 35.6 g. (90%) of dihydro-2-isopropylidene-3,5,5-trimethyl-4H-1,3-oxazine-4,6(5H)-dione, B.P. 85° C. (0.2 mm.). The following equation represents the reaction that took place.

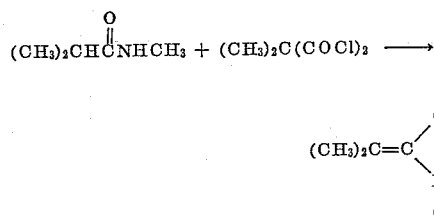

The infrared spectrum of this material was identical to that of the product of Example 4.

The following examples show that unsubstituted amides can also be used in this invention. When using unsubstituted amides in the present invention, the structure of the final product depends upon the presence or absence of a hydrogen chloride acceptor material in the reaction medium. Example 18 illustrates the reaction in the absence of a hydrogen chloride acceptor.

Example 18

A solution of isobutyramide (17.4 g.; 0.2 mole) and of dimethylmalonyl chloride (37.2 g.; 0.22 mole) in ethylene dichloride (125 ml.) was refluxed for 3½ hr. The solvent was removed in vacuo to give 38 g. of crude product. A portion of this material was recrystallized several times from methanol to give dihydro-2-isopropylidene-5,5-dimethyl-4H-1,3-oxazine - 4,6(5H) - dione, M.P. 153–158° C. The reaction that occurred is represented by the following example:

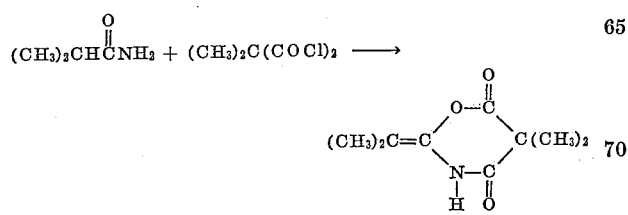

The NMR spectrum (in CHCl$_3$ at 60 mc.) showed a singlet at 1.43 (gem-dimethyl group), a singlet at 1.76 (methyl on olefinic linkage) and a broad singlet at 10.12 p.p.m. (—NH—).

A different orientation of groups occurs when the reaction of a disubstituted malonyl chloride with an unsubstituted amide, thioamide or acetamidine is carried out in the presence of a hydrogen chloride acceptor material. The following formula which was designed to cover reactions of malonyl chlorides with unsubstituted amides when run in the presence of a hydrogen chloride acceptor material is suggested and used here to demonstrate attachment of a group to the nitrogen.

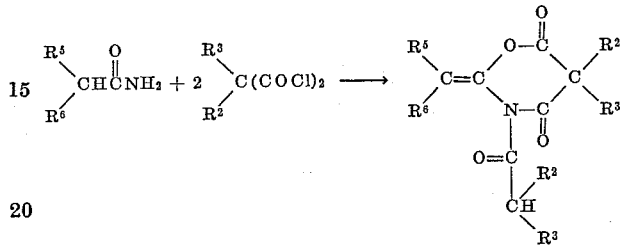

where $R^2$, $R^3$, $R^5$ and $R^6$ respectively are as previously described.

Examples 19 and 20 illustrate the use of unsubstituted amides with a hydrogen chloride acceptor material.

Example 19

To a stirred solution of acetamide (59 g.; 1.0 mole) and triethylamine (303 g.; 3.0 moles) in toluene (1,000 ml.) was added slowly diamethylmalonyl chloride (169 g.; 1.0 mole). The temperature was kept at 60–70° C. during the addition and the mixture was later stirred at room temperature for 12 hr. The triethylamine hydrochloride 263 g. (96%) was removed by filtration and the filtrate distilled through a 6-in. Vigreux column to give 59 g. of dihydro-3-isobutyryl-5,5-dimethyl-2-methylene-4H-1,3-oxazine-4,6(5H)-dione, B.P. 83–87° C. (0.07 mm.), $n_D^{20}$ 1.4850.

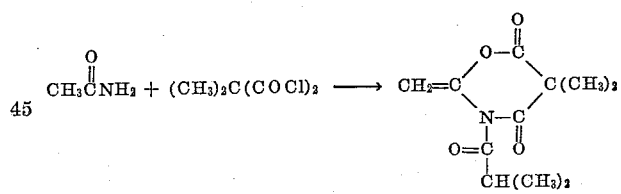

*Analysis.*—Calcd. for C$_{11}$H$_{15}$NO$_4$: C, 58.7; H, 6.7; N, 6.2. Found: C, 58.8; H, 7.1; N, 6.2.

Example 20

To a stirred solution of isobutyramide (43.5 g.; 0.5 mole) and triethylamine (151 g.; 1.5 moles) in toluene (500 ml.) was added slowly dimethylmalonyl chloride (84.5 g.; 0.5 mole). The temperature was kept at 60° C. during the addition and the mixture was later stirred at room temperature for 5 hr. The triethylamine hydrochloride was removed by filtration and the filtrate was distilled through a 6-in. Vigreux column to give 27.5 g. of dihydro - 3 - isobutyryl - 2 - isopropylidene - 5,5 - dimethyl-4H-1,3-oxazine-4,6(5H)-dione, B.P. 110–114° C. (0.07 mm.).

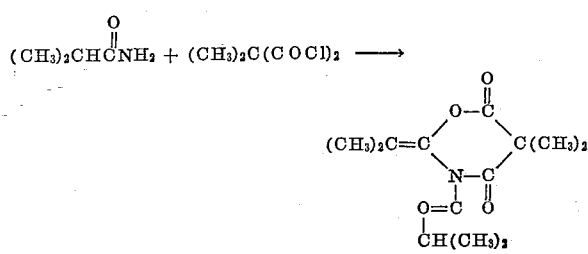

*Analysis.*—Calcd. for $C_{13}H_{19}NO_4$: C, 61.6; H, 7.6; N, 5.5. Found: C, 62.3; H, 7.7; N, 5.5.

Although the invention has been described in considerable detail with particular reference to certain preferred embodiments thereof, variations and modifications can be effected within the spirit and scope of the invention as described hereinbefore, and as defined in the appended claims.

We claim:

1. An azinedione of the formula:

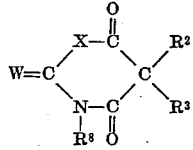

in which W has the formula (a) 

or (b) 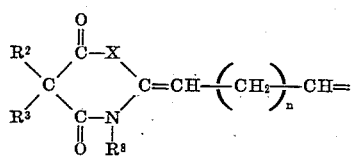

X is
 (a) oxygen
 (b) sulfur, or
 (c) imino of the formula

each of $R^2$ and $R^3$, when taken singly, is
 (a) alkyl of 1 to 10 carbons, or
 (b) mononuclear aryl of 6 to 10 carbons
each of $R^4$ and $R^8$, when taken singly, is
 (a) hydrogen
 (b) alkyl of 1 to 10 carbons
 (c) mononuclear aryl of 6 to 10 carbons, or
 (d) acyl of the formula

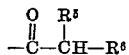

each of $R^5$ and $R^6$, when taken singly, is
 (a) hydrogen
 (b) alkyl of 1 to 10 carbons,
 (c) mononuclear aryl of 6 to 10 carbons, or
 (d) halogen
  $R^2$ and $R^3$, when taken collectively with the carbon atom to which they are attached, represent joined alkylene groups completing a carbocyclic ring of 4 to 6 ring carbon atoms
  $R^5$ and $R^6$, when taken collectively with the carbon atom to which they are attached, represent joined alkylene groups completing a carbocyclic ring of 4 to 6 ring carbon atoms
  $R^6$ and $R^8$, when taken collectively with the carbon and nitrogen atom to which they are attached, represent joined alkylene groups completing a heterocyclic ring of 4 to 6 ring atoms, and
 n is an interger from 0 to 8.

2. A compound as defined in claim 1 having the formula:

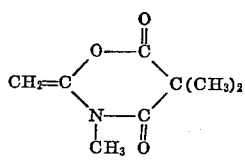

3. A compound as defined in claim 1 having the formula:

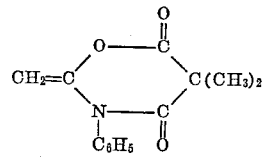

4. A compound as defined in claim 1 having the formula:

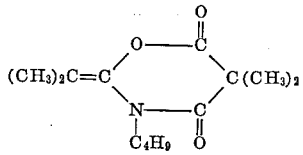

5. A compound as defined in claim 1 having the formula:

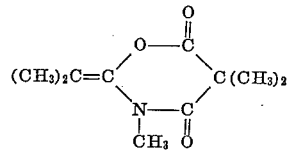

6. A compound as defined in claim 1 having the formula:

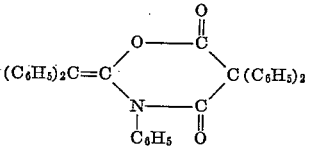

7. The process which comprises contacting a compound of the formula

with a malonyl chloride of the formula

and obtaining an azinedione of the formula:

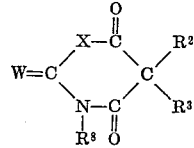

wherein M is (a)

$\begin{matrix} R^5 \\ R^6 \end{matrix} CH-$ or (b) $R^1-NH-\overset{X}{\underset{\|}{C}}-CH_2-\left(CH_2\right)_n-CH_2-$ W is (a)

$\begin{matrix} R^5 \\ R^6 \end{matrix} C=$ or (b) 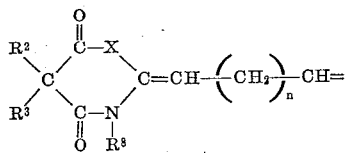

X is
(a) oxygen,
(b) sulfur, or
(c) imino of the formula

each of $R^1$ and $R^4$, when taken singly, is
(a) hydrogen,
(b) alkyl of 1 to 10 carbons, or
(c) mononuclear aryl of 6 to 10 carbons each of $R^2$ and $R^3$ is
(a) alkyl of 1 to 10 carbons, or
(b) mononuclear aryl of 6 to 10 carbons each $R^5$ and $R^6$, taken singly, is
(a) hydrogen,
(b) alkyl of 1 to 10 carbons,
(c) mononuclear aryl of 6 to 10 carbons, or
(d) halogen $R^8$, when taken singly, is
(a) hydrogen
(b) alkyl of 1 to 10 carbons,
(c) mononuclear aryl of 6 to 10 carbons, or
(d) acyl of the formula

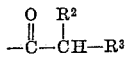

$R^6$ and $R^1$, when taken collectively with the carbon and nitrogen atoms to which they are attached, and $R^6$ and $R^8$, when taken collectively with the carbon and nitrogen atoms to which they are attached, represent the same joined alkylene groups which, with the atoms to which they are attached, complete a heterocyclic ring 4 to 6 ring atoms $R^5$ and $R^6$, when taken collectively with the carbon atom to which they are attached, represent joined alkylene groups completing a carbocyclic ring of 4 to 6 ring carbon atoms and $n$ is an integer from 0 to 8.

8. The process according to claim 7 in which the contacting of the compound of the formula

and the malonyl chloride is carried out in the presence of a dipolar aprotic solvent.

9. The process according to claim 8 in which the contacting of the compound of the formula

and the malonyl chloride is carried out in the presence of a material which is a hydrogen chloride acceptor.

10. The process according to claim 9 in which the contacting of the compound of the formula

and the malonyl chloride is carried out at a temperature of about 0° C. to about 200° C.

References Cited
UNITED STATES PATENTS 3,251,838  5/1966  Kalm _____ 260—244

JOHN D. RANDOLPH, *Primary Examiner.*

R. T. BOND, *Assistant Examiner.*